Figure 1:
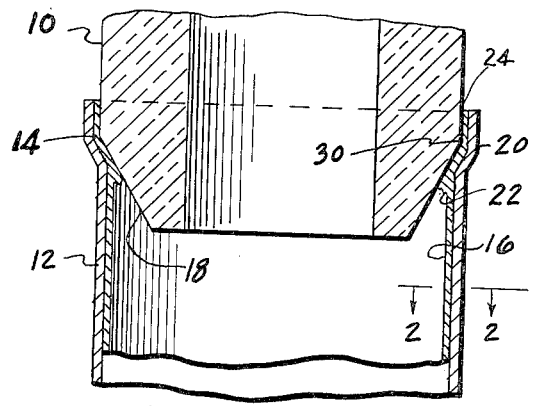

May 29, 1962  T. G. BRANIN  3,036,674
COMPRESSION SEAL AND SEALING MATERIAL THEREFOR
Filed Feb. 23, 1960

INVENTOR.
THERON G. BRANIN
BY
L. A. Larsen
ATTORNEY

United States Patent Office 3,036,674
Patented May 29, 1962

3,036,674
COMPRESSION SEAL AND SEALING MATERIAL THEREFOR
Theron Gerald Branin, Lancaster, Pa., assignor to Radio Corporation of America, a corporation of Delaware
Filed Feb. 23, 1960, Ser. No. 10,370
5 Claims. (Cl. 189—36.5)

The present invention relates to seals, and particularly to seals of the compression type and a novel sealing material used advantageously in such seals.

Compression type seals are utilized in certain electron tube constructions for sealing two tubular members in vacuum tight manner. In such constructions two tubular members are urged into telescoped relation with sufficient force to produce a radial component capable of deforming a sealing material, usually in the form of a coating on one of the members, to produce a vacuum tight seal. Compression type seals are also employed in certain ultra high vacuum valves, wherein one of the members constitutes a cylindrical closure element and the other comprises a valve seat.

Heretofore, one sealing material interposed between the members to be sealed has comprised copper. This material has been favored because of its responsiveness in plastic flow to pressures exerted thereon. Such plastic flow contributes to the formation of a vacuum tight seal.

The use of copper, however, as a sealing material has not been entirely satisfactory. One reason for this is that copper oxidizes readily and forms an oxide that may penetrate the region of the seal. Due to the porous nature of copper oxide, its presence at the seal region seriously impairs the seal. Furthermore, when copper is used as a sealing material in valves subjected to repeated openings and closures, it assumes a brittle state with consequent impairment of its plastic fluidity and its seat forming functions.

In view of the limitations associated with copper as a sealing material, other materials have been sought, for sealing and valve seating purposes. One of such materials is gold. Among its attractions for this purpose are its plastic flow response, its substantial freedom from oxidation, and its ability to tolerate repeated deformations without evidence of embrittlement.

However, the foregoing attractive features of gold as a sealing or seating material are seriously impaired by a characteristic of gold which becomes manifest when gold is utilized as a coating having the thickness necessary for service as a sealing or seating material. Such thickness in some applications is about 2 mils. When gold of this thickness is applied to a substrate by plating, for example, it undergoes growth of grain size and forms a relatively rough crystalline surface. The outer layer of the gold coating forming such rough surface is poorly adherent and crumbles and falls from the gold coating in response to the slightest touch. Such surface is poorly suited for use in a seal.

It is a purpose of the invention to provide an improved seal formed by compression of a flowable sealing material.

Another object is to provide an improved sealing material for use in a compression seal.

A further purpose is to provide a coating of sealing material on a member to be involved in a compression seal, wherein the sealing material is predominantly gold and the coating has a thickness required for a good seal.

A further object is to provide a sealing material in the form of a composite coating comprising relatively thick layers of gold between which are interposed relatively thin layers of a metal having substantially the same flow response to pressure as gold.

Another purpose is to provide a coating of sealing material wherein the coating comprises alternate layers of gold and copper and wherein the gold layers are sufficiently thin to preclude the formation of rough crystalline surfaces thereon.

A further aim is to provide a composite coating of sealing material comprising alternate layers of gold and of a metal more readily subject to oxidation than gold, and wherein the layers of the aforementioned metal are appreciably thinner than the layers of gold.

In one embodiment selected as an example, the inner surface of a first tubular member made of stainless steel for example, is alternately coated with gold and copper by plating, to produce a composite coating having a thickness of about 2 mils. Each of the gold layers has a thickness of from about 0.2 to about 0.3 mil and each copper layer has a thickness of about 0.05 mil. The term "mil" as used herein is intended to denote a unit of length or thickness equal to one thousandth of an inch. The bottom and top layers are made of gold to preclude oxidation of the intermediate layers of copper. The coating so formed responds in plastic flow when a second tubular member made of ceramic, for example is forcefully telescoped into the first member and into engagement with the coating, for producing a good vacuum tight seal. The coating is substantially free from oxidation when exposed to the ambient atmosphere, and does not become brittle when worked as in a valve.

Further objects and features of the invention will become evident as the present description proceeds.

Figure 2:
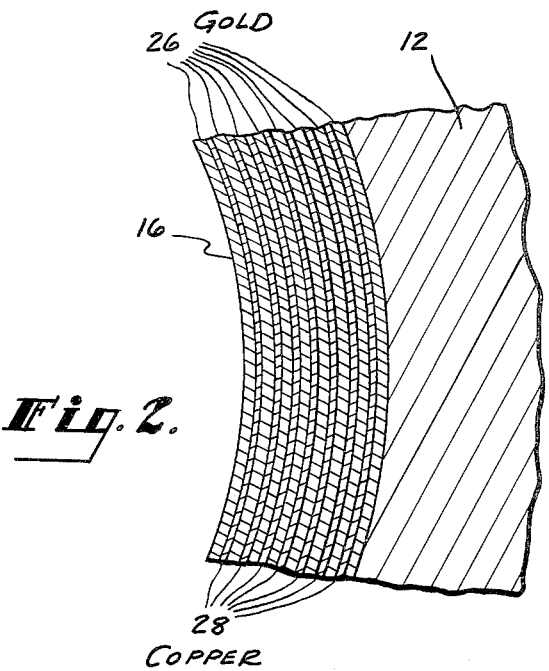

Reference to the drawing for a more detailed consideration of an embodiment of the invention will reveal that FIG. 1 is a sectional view in elevation of a compression seal embodying the invention; and FIG. 2 is an enlarged fragmentary sectional view taken along the line 2—2 of FIG. 1.

As shown in FIG. 1, a structure involved in one type of compression seal comprises two tubular members 10, 12 in telescoped relation and engaging each other in an annular region 14 of relatively small axial extent, to concentrate the force applied to the two members to a relatively small area and thereby obtain a relatively high pressure per unit of area. The surface of one of the members so engaged is provided with a coating 16 of a sealing material characterized by plastic flow in response to such pressure.

The structure shown may comprise part of a relatively large electron tube wherein the tubular member 10 may be made of a ceramic such as aluminum oxide and the tubular member 12 may be made of a metal such as stainless steel. With slight modification, the structure may also be used in an ultra high vacuum valve. The modification may be the substitution of a solid disc or a relatively short solid cylinder for the tubular member 10, but retaining the taper 18 therein to form the small area engagement 14.

To form a seal at area 14, member 10 is telescoped partly into the member 12 with appreciable force. While member 12 has a slightly smaller internal diameter than the outer diameter of member 10, the taper 18 in member 10 permits an initial partial and substantially forceless entrance of the member 10 into the member 12. Thereafter, application of the force aforementioned produces radial enlargement of the member 12 as shown at 20, as this member accommodates itself to the periphery of member 10. During such accommodation, the member 10 enters member 12 with the application of considerable pressure per unit area on the intervening coating 16. This pressure produces plastic flow in the coating 16 and forms an enlarged annular coating mass 22.

It is desirable that the coating respond in plastic flow to the force used in urging the members 20, 12 into telescoped relation. Such plastic flow causes the coating 16 to follow any irregularity in the engaged portion of member 10 to thereby contribute to a vacuum tight seal. Furthermore, it is desirable that surface and subsurface portions of the coating 16 disposed in the annular seal area 14 be free from oxides. Oxides are generally porous and allow some seepage of gas therethrough. In addition, it is desirable that the material of coating 16 be free from embrittlement when worked, as when employed in a valve subject to repeated openings and closures. Furthermore, it is desirable that the exposed coating surface be free from enlarged grain or crystal formations.

Applicant has found that a composite coating formed by alternate layers of gold and copper possesses the desirable features aforementioned and is well suited for service as a sealing material in the environment described. The best form of such coating, for use in relatively large power electron tubes or in relatively large valves, is shown in FIG. 2.

The coating comprises alternate layers of gold 26 and copper 28. The initial layer applied to the base 20, is preferably gold. This preference is dictated by several considerations, including the relatively good adherence of a plated coating of gold on a base such as stainless steel, and the substantial freedom from oxidation of gold. Such freedom from oxidation precludes reaction of the primary layer with oxygen occluded in the pores of the base, and assures stable adherence of the coating as a whole to the base. The final layer should also preferably be gold, to cause the exterior surface of the coating to be substantially free from oxidation and thereby contribute to an improved seal.

For best results, the layers of gold should each have a thickness of from about 0.2 to about 0.3 mil. A thickness greater than about 0.3 mil involves hazards of objectionable grain and crystal growth. Such growth has been found by applicant to take place to an objectionable degree when the coating thickness exceeds 0.4 ml. Thus, while it is desirable for best results that the layers of gold be relatively thick they should be limited to a thickness no greater than about 0.3 mil.

The copper layers serve primarily to isolate the gold layers for the purpose of preventing the objectionable grain and crystal growth aforementioned. In view of the fact that copper oxidizes more readily than gold, it is preferred according to the invention to limit the copper layers to a thickness which safely accomplishes the isolating function referred to with a minimum of oxidation. Applicant has found that the best thickness of each copper layer, for effectively isolating the gold layers while reducing to a minimum tendencies of the coating to oxidize, is about 0.05 mil. This renders each copper layer slightly more than one-tenth as thick as each gold layer.

Alternate layers of gold and copper may be applied to a base in accordance with the foregoing, to provide any desired coating thickness. In one specific example involving a relatively large power electron tube, as shown in FIG. 1, such thickness is about 2 mils, as depicted in FIG. 2. In this example the coating 16 consists of eight layers 26 of gold and seven layers 28 of copper. Each layer of gold is about 0.2 mil thick and each copper layer is about 0.05 mil thick. This results in a coating having a thickness of 1.95 mils if the exact values referred to are observed. This is sufficiently close to the value of 2 mils referred to, to constitute an acceptable approximation thereto.

One way in which the layers of gold and copper may be applied to the inner wall of the tubular member 12 is by electroplating. In forming the coating 16 shown in FIG. 2, eight plating cycles are required for application of the eight gold layers 26, and seven plating cycles are employed to form the seven copper layers 28. During each plating cycle, areas of the tubular member 12 on which no coating is desired, are suitably covered to isolate such areas from the plating bath.

The eight cycles for applying the eight layers of gold are substantially the same. Each cycle involves immersion of a portion of the tubular member 12 including the area to be coated and other areas suitably masked, into a plating bath. In one example, the plating bath consisted of:

Gold as metal, 4.97 grams/lit.±1.02 grams/lit.
Free sodium cyanide, 13.81 grams/lit.±1.97 grams/lit.
Disodium phosphate, 7.89 grams/lit.±1.58 grams/lit.

A plating current having a density of 0.0075 ampere per square centimeter was used. The portion aforementioned of tubular member 12 was permitted to remain in the bath for 15 minutes at the aforementioned current density. The thickness of the gold plating applied under these conditions was about 0.2 mil.

Each plating cycle for forming each of the copper layers 28, in the example under consideration, involved immersion of the aforementioned portion of tubular member 12, suitably masked as indicated before herein, in a plating bath consisting of:

Copper as metal, 11.0 grams/lit.±2.4 grams/lit.
Free potassium cyanide, 7.9 grams/lit.±1.6 grams/lit.
Potassium hydroxide, 31.6 grams/lit.±15.7 grams/lit.

at a current density of 0.045 ampere per square centimeter, for a period of 0.25 minute. Each of such plating cycles produced a copper layer on the unmasked portion of member 12 having a thickness of about 0.05 mil. The layer so formed may also be termed a strike in view of the high ratio of current density to the amount of metal used in the plating bath.

The foregoing plating steps produced the composite coating 16 shown in FIG. 2, on the inner surface of the tubular member 12.

In one example of a power tube envelope construction, the stainless steel tubular envelope portion 12 including the coating 16 on its inner surface, had a cylindrical structure with an inner diameter of about 9.950 inches, and a thickness, inclusive of the coating 16 of .112 inch. The ceramic tubular member 10 made of aluminum oxide, was also of cylindrical shape, with an outer diameter of 10.170 inches and a wall thickness of .525 inch. The taper 18 described an angle of about 7° with respect to the axis of the member 10. The tapered portion referred to had a length of .275 inch. This length was sufficient to permit the free end portion thereof to freely enter one end of the tubular member 12. The angle of 7° aforementioned described by the taper 18 was also of advantage in providing an annular small-angle juncture 30 between the outer cylindrical portion of member 10, and the tapered portion thereof. This juncture, in being constituted in part by the cylindrical outer wall of member 10, was characterized by a larger diameter than the inner diameter of the structure comprising member 12 with the coating 16 thereon. As a consequence, a further forced entry of the member 10 into the member 12 resulted in appreciable pressure per unit of area between the two members in sealing region 14. The force exerted on member 10 to produce the required sealing pressure was 18,000 pounds.

In response to such pressure, the coating 16 underwent plastic flow, resulting in a thinning down of the coating at sealing region 14 and a thickening of the coating adjacent to the sealing region, as shown at 22. Such thinning down and thickening of the coating 15 involved migration of the material without appreciably affecting its composite character. Thus, where the coating was thinned down, as at the seal region, the final layer of gold constituting the exposed surface of coating 16, was still present, although appreciably thinner than when first applied. This indicates that the coating underwent substantially homogeneous plastic flow in response to pressure.

The persistence of the discrete character of each of the several layers of the coating during sealing deformation of the coating is believed to be due to the fact that gold and copper have substantially the same flow response to pressure. Thus, pressure deformation of the outer layer of the coating will be transmitted uniformly to the intermediate layers and will not be concentrated solely in the outer layer. Such concentration of the pressure in the outer layer, as would occur if the non-gold layers were made of a relatively hard material such as nickel, would probably result in removal of a portion of the outer gold layer from the adjacent non-gold layer. But not only is the copper of substantially the same hardness as gold, but the relatively thin form of the layers thereof causes the copper layers to accommodate themselves to deformations produced in the gold layers, without that degree of opposition that would produce copper-exposing displacements of the gold layers.

The composite coating of the invention is substantially as effective for service as a sealing material as a theoretical single coating of gold of the same thickness and free from the disadvantage of excessive grain and crystal growth.

It is thus feasible according to the invention to provide an article having a composite coating thereon formed by alternate layers of gold and non-gold material. While one non-gold material i.e., copper, has been described in the foregoing, it is feasible to substitute for copper any other metal or alloy having substantially the same plastic flow response to pressure as copper.

Furthermore, while the best composite coating in the example described has a thickness of about 2 mils, it is feasible to make a composite coating in accordance with the invention that is thicker or thinner than 2 mils, and which will produce satisfactory results as a sealing material. Not only are departures from the 2 mils thickness value feasible with acceptable results, even in the described example, but in applications involving appreciably larger or smaller work pieces, such departures may be desirable.

What is claimed is:

1. An article comprising a structure including a portion having a coating thereon, said coating consisting of alternate layers of gold, and of non-gold metal having substantially the same plastic flow response to pressure as gold, each of said gold layers being from about 0.2 mil to 0.4 mil thick, each of said non-gold layers being thinner than any one of said gold layers.

2. An article comprising a structure having a coating on one of the surfaces thereof, said coating consisting of alternate layers of gold, and of non-gold metal subject to greater oxidation than gold and having substantially the same plastic flow response to pressure as gold, the primary layer of said coating adjacent to said one of said surfaces and the final and exposed surface layer of said coating consisting of gold, each of said gold layers having a thickness of from about 0.2 mil to 0.4 mil, each of said non-gold layers having a thickness of about 0.05 mil.

3. An article comprising a base having thereon a composite coating characterized by a substantial homogeneous plastic flow response to pressure for service as an improved sealing material, said composite coating consisting of alternate layers of gold and copper, one of said gold layers constituting the primary layer adjacent to said base for shielding the next adjacent copper layer from gases occluded in said base, another of said gold layers comprising the exposed surface layer of said coating for shielding the next adjacent and lower layer of copper from the ambient atmosphere, each of said gold layers having a thickness of from about 0.2 mil to about 0.4 mil for preserving said gold layers from undesirable crystal enlargement, each of said copper layers having a thickness equal to about one-tenth of the thickness of one of said gold layers.

4. An article comprising a structure including a base having thereon a composite electroplated coating, said coating consisting of a plurality of alternate layers of gold and copper, each of said gold layers having a thickness of from about 0.2 to about 0.3 mil, each of said copper layers having a thickness of about 0.05 mil, two of said gold layers constituting the primary and surface layers of said coating, said coating being responsive to pressure in a substantially homogeneous plastic flow, whereby said coating is adapted to serve advantageously as a sealing material between said article and another article for forming an improved pressure seal between said articles.

5. A vacuum tight envelope including two members, one of said members having a coating on a predetermined area thereof, means urging said members together at region including said area with a pressure to cause plastic flow in said coating for sealing said members in vacuum tight manner, said coating consisting of alternate electroplated layers of gold and copper, one of said gold layers comprising the final layer of said coating, each of said gold layers having a thickness of from about 0.2 mil to about 0.3 mil, each of said copper layers being about 0.05 mil thick for rendering said plastic flow response substantially homogeneous throughout said coating in said area.

References Cited in the file of this patent

UNITED STATES PATENTS

| | | |
|---|---|---|
| 1,008,845 | Meier | Nov. 14, 1911 |
| 1,288,916 | Keyes | Dec. 24, 1918 |
| 2,053,765 | Dana | Sept. 8, 1936 |